H. S. ESCH.
ANTISLIP ARMOR FOR CUSHION TIRES.
APPLICATION FILED NOV. 29, 1920.
1,407,522. Patented Feb. 21, 1922.
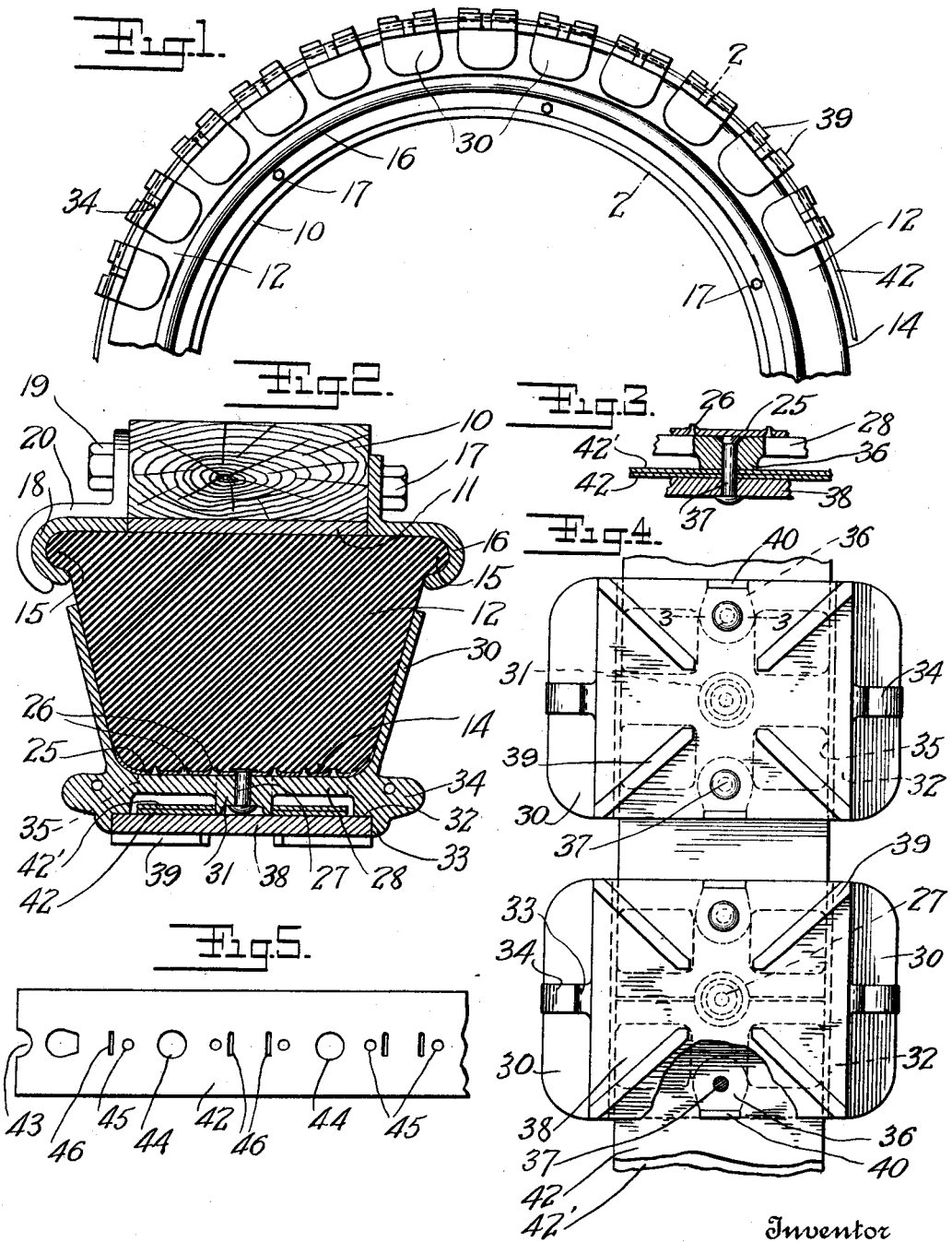
Inventor
Henry S. Esch
By his Attorney
Charles L. Wright.

UNITED STATES PATENT OFFICE.

HENRY S. ESCH, OF NEW YORK, N. Y.

ANTISLIP ARMOR FOR CUSHION TIRES.

1,407,522.   Specification of Letters Patent.   Patented Feb. 21, 1922.

Application filed November 29, 1920. Serial No. 426,989.

*To all whom it may concern:*

Be it known that I, HENRY S. ESCH, a citizen of the United States, residing in New York, in the county of New York and State of New York, have invented certain new and useful Improvements in Antislip Armors for Cushion Tires, of which the following is a specification.

The specific object of this invention is to provide a plurality of closely connected armor elements arranged circumjacent to the tire, these elements acting as an armor, preventing abrasion and reducing wear of the tire and, at the same time, materially increasing the tractive effect of the wheel while preventing side slipping or skidding upon icy, oily or slippery surfaces.

A further object is to provide such armor devices with means whereby their calk-like tread elements can be replaced when worn, while the underlying armor plates are substantially indestructible.

These and other objects, such as initial low cost, adaptability to tires of ordinary construction, ease of application and safety secured by their use, are attained by the peculiar construction and combination of parts hereinafter described and shown in the accompanying drawings, forming an essential part of this disclosure, and in which:—

Figure 1 is a partial side elevational view of a conventional tire showing the application of the armor elements.

Figure 2 is an enlarged transverse sectional view of the tire taken through the center of one of the armor elements on line 2—2 of Fig. 1.

Figure 3 is a fragmentary sectional view, taken on line 3—3 of Fig. 4, showing the method of riveting the parts.

Figure 4 is a plan view looking at the face side and showing a pair of armor elements, parts being broken away to show the construction.

Figure 5 is a partial plan view of one of the engaging bands.

Referring to the drawings in detail, the numeral 10 designates the felly of a vehicle wheel, supported by spokes (not shown) circumjacent to which is a metal rim or band 11 acting as a seat for the solid cushion tire 12, upon which the elasticity of the wheel depends.

The sides of the tire taper outwardly from its periphery 14 to the base or widest portion, adjacent the band 11, and are extended laterally outward into annular beads 15, one of which enters the correspondingly shaped cavity in the tire clamp 16 held by the screws 17 to the felly, while the other bead is similarly held in the opposite clamp 18 secured in place on the felly by removable clips 20 held by the screws 19.

The foregoing description is to be understood as applicable to any ordinary type of cushion tread wheel and not as forming any part of the invention which will now be disclosed.

A plurality of relatively thin metal plates 25, preferably sheet steel, of oblong rectangular shape having rounded corners, are curved upwardly at each end and pierced in such manner as to form a plurality of sharp spurs 26 adapted to become embedded in the face or tread surface 14 of the tires.

Attached to each of these plates, by a central rivet 27, is a metal frame 28 having opposed, plate-like projections 30 suited to engage closely upon opposite sides of the tire 12, as best shown in Fig. 2.

The rivets 27 pass through central bosses 31 on the opposite sides of the frames 28, these sides being relatively smooth and level except along their side edges where raised level seats 32 are formed, having central lateral extensions 33 blending into lugs 34 on opposite sides.

These frames in their plate portions contain through openings 35 and have near their ends raised bosses 36 drilled to receive rivets 37 used to connect the spur or tread plates 38, the same resting on the seats 32 between the extensions 33 and which are provided on their outer surfaces with raised ledges or spurs 39, here shown as extending inward transversely from the corners of the plates 38.

These plates are recessed at the front and back to receive projections 40 formed with the frames 28 at their edges adjacent the bosses 36, the latter elements being in the same plane as the seats 32.

Disposed between the faces of the frames 28 and backs of the spur plates 38 are two or more metal bands 42 and 42', their ends being notched as at 43, to meet and avoid the center projecting boss 31 and rivet 27 at the point of juncture, other openings 44 permitting corresponding bosses and rivets in adjacent armor elements to pass through.

Smaller openings 45 allow the end rivets 37 to pass, as best shown in Fig. 3, these rivets uniting the several bands between the frames and plates in a secure manner.

Elongated rectangular openings 46 are also formed in the bands to engage with the projections 40 which extend therethrough.

Should the tread plates become worn the rivets 37 may be removed and fresh tread plates readily substituted.

From the foregoing it will be seen that an effective and easily applied device has been disclosed capable of fulfilling the several purposes of the invention in a satisfactory manner.

Having thus described my invention and set forth the manner of its construction, application and use, what I claim as new and desire to secure by Letters Patent, is:—

1. In a device of the class described, the combination with a plurality of frames having retaining elements engageable with the sides of a tire, a plate in each frame adapted to engage the periphery of the tire, tread plates secured to said frames and means for connecting said elements over the tire.

2. In a device of the class described, the combination with a plurality of armor elements comprised of tire contact sections and tread sections, of bands connecting said elements and means formed with said contact sections passing through openings in said bands whereby they are firmly secured in operative relation.

3. In a device of the class described, the combination with frames having raised wing elements, plates united to said frames, prongs formed with said plates adapted to engage a tire between the wing elements, lateral seats on said frames, raised bosses at the ends of the frames, spurred tread plates adapted to rest on said seats and bosses and means for spacedly engaging said frames around the tire.

4. In a device of the class described, the combination with frames having raised wing elements, plates united to said frames, said plates adapted to engage a tire between the wing elements, lateral seats on said frames, raised bosses at the ends of the frames, spurred tread plates adapted to rest on said seats and bosses, one or more bands having openings receptive of said bosses and means for securing said bands intermediate of said frames and the tread portions of said frames.

In testimony whereof I have signed my name to this application.

HENRY S. ESCH.